No. 794,198. Patented July 11, 1905.

UNITED STATES PATENT OFFICE.

WILLIAM STEWART, OF MOUNT FLORIDA, GLASGOW, SCOTLAND.

PROCESS OF REMOVING OR RECOVERING ZINC FROM ORES.

SPECIFICATION forming part of Letters Patent No. 794,198, dated July 11, 1905.

Application filed June 28, 1904. Serial No. 214,451.

*To all whom it may concern:*

Be it known that I, WILLIAM STEWART, a citizen of the United Kingdom of Great Britain and Ireland, residing at 5 Cathkin Terrace, Mount Florida, Glasgow, Scotland, have invented a certain new and useful Improved Process of Removing or Recovering Zinc from Ores, of which the following is a specification.

My invention relates to an improved process for removing or recovering zinc from ores containing it, especially, but not exclusively, from complex or refractory ores containing zinc together with gold and silver, one of the objects being by removal of the zinc to facilitate the recovery of the gold and silver contained in such ores by any known process.

Under the present invention the ore is first pulverized and is thereafter intimately mixed with suitable proportions of bisulfate of soda or bisulfate of potash and of common salt, the proportions necessarily varying according to the nature of the ores being treated and the percentage of zinc therein. The bisulfate of soda or bisulfate of potash may vary from about three to about seventy per centum of the weight of the ore and the common salt from about two to about sixty per centum, according to circumstances. The mixture of pulverized ore and bisulfate of soda or bisulfate of potash and common salt is put into a reverberatory or other suitable furnace and is brought to a red heat and maintained thereat with a limited supply of air for about from fifteen minutes to three hours, the time varying according to the nature of the ore being treated and the percentage of zinc therein. Small charges are during the furnacing drawn from the furnace at short intervals, so that the condition of the zinc in the mixture as to solubility may be ascertained and the heat maintained or the charge withdrawn, according to the results indicated, a too prolonged furnacing being in this way guarded against in order to prevent oxidation of the zinc or the soluble salts being split up and the zinc again becoming insoluble. The zinc is by this treatment brought to the condition of salts soluble in water or slightly-acidulated water, and when testing of the small charges taken from the furnace indicates that the zinc is wholly or almost entirely converted into such soluble salts then the charge is withdrawn from the furnace, allowed to cool, and thereafter leached or lixiviated in any ordinary manner. The zinc salts are thereafter precipitated and recovered by any known process. In ores containing gold and silver along with zinc, from which on account of the presence of zinc it is difficult or impossible to extract the precious metals by ordinary known processes, the removal of the zinc in the manner above described will enable the precious metal to be readily extracted by such known processes.

Having now described the invention, what I claim, and desire to secure by Letters Patent, is—

A process for removing or recovering zinc from ores containing it, said process consisting of pulverizing the ores, mixing therewith bisulfate of an alkali metal, and common salt, furnacing at a red heat and thereafter lixiviating or leaching and precipitating the zinc salts, substantially as set forth.

In testimony whereof I have signed my name to this specification in the presence of two subscribing witnesses.

WILLIAM STEWART.

Witnesses:
 ROBERT BROWN,
 JAMES McCLURE, Junr.